(Model.)

B. F. D. MILLER.
ANIMAL TRAP.

No. 267,915.      Patented Nov. 21, 1882.

WITNESSES:

INVENTOR:
B. F. D. Miller
BY
ATTORNEYS.

UNITED STATES PATENT OFFICE.

BENJAMIN F. D. MILLER, OF WOOSTER, OHIO, ASSIGNOR TO HIMSELF AND GEORGE C. NIMMONS, OF SAME PLACE.

ANIMAL-TRAP.

SPECIFICATION forming part of Letters Patent No. 267,915, dated November 21, 1882.

Application filed July 10, 1882. (Model.)

*To all whom it may concern:*

Be it known that I, BENJAMIN F. D. MILLER, of Wooster, in the county of Wayne and State of Ohio, have invented a new and Improved Animal-Trap, of which the following is a full, clear, and exact description.

This invention relates to a self-setting animal-trap; and it consists of the construction, arrangement, and combination of parts, as hereinafter described and claimed.

Reference is to be had to the accompanying drawings, forming part of this specification, in which similar letters of reference indicate corresponding parts in both the figures.

Figure 1:
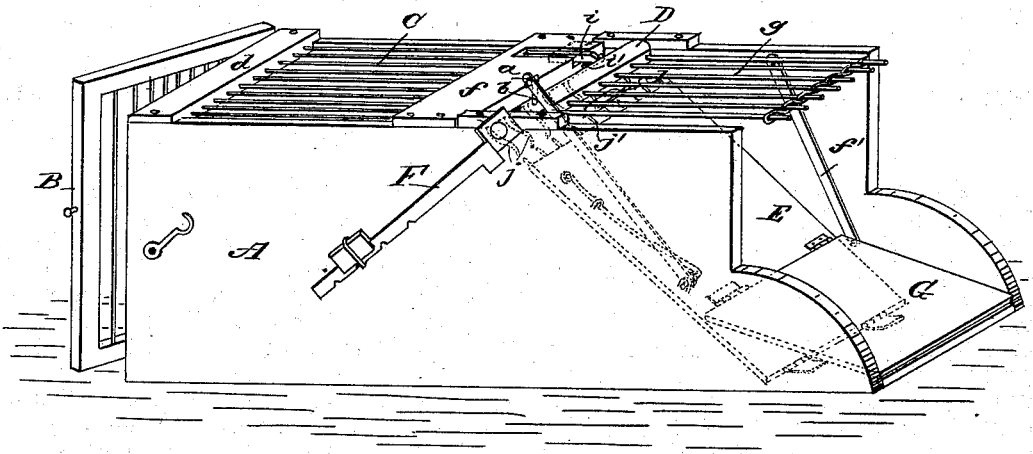
Figure 2:
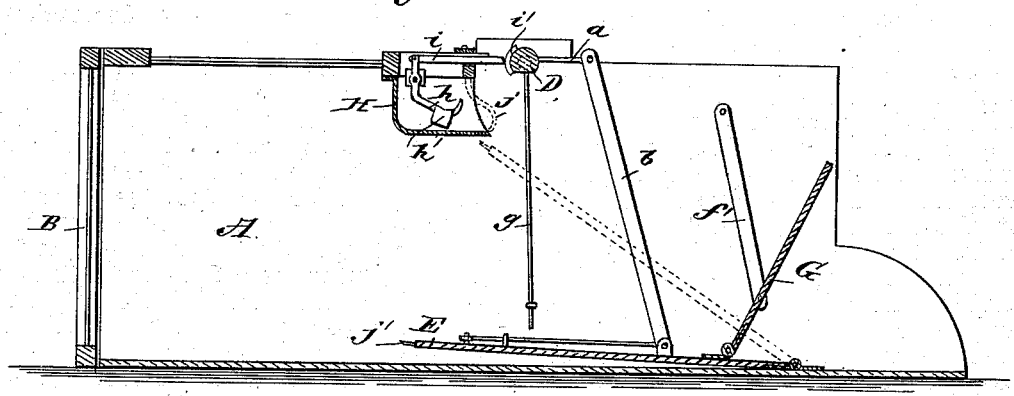

Figure 1 is a perspective view of my new and improved animal-trap as it appears when set; and Fig. 2 is a vertical longitudinal section thereof, showing the parts of the trap as they appear just as the trap is sprung.

The box A of the trap may be of any suitable size. It is closed at its rear end by the door B, which is wired, as shown, and at the top by the wires C, which are made fast at their rear ends in the cross-piece $d$, and at their forward ends in the central cross-piece, $f$. In front of the cross-piece $f$, and near to it, is journaled in the upper edges of the side pieces of the box A the rock-shaft D. This shaft has secured in it the series of forwardly-projecting wires, $g$, which are of a length about equal to the depth of the box A; and the shaft is connected, by means of the arm $a$ and connecting-rod $b$, to the board E, which is hinged to the bottom of the box A.

Upon one end of the shaft D, outside of the box A, is fixed the arm F, which is so weighted as to normally hold the shaft so turned that the wires $g$ will be held thereby in a horizontal position, and the board E in an inclined position, as shown in Fig. 1.

G is a tip-up board, hinged to the board E, and connected by the rod $f'$ to one side of the box A, so that when the trap is sprung by an animal standing upon the board E pulling at the bait attached to the bait-hook $h$, the rear end of the board will be thrown up to the position shown in Fig. 2, for frightening the animal into the box.

The trap is held in set position by means of the sliding bar $i$ engaging with the detent $i'$ attached to or formed upon shaft D. This detent is segmental in form, as shown in Fig. 2, so that the forward end of the sliding bar $i$ will rest against its outer circular edge, as against a cam, at all times except when the trap is set; and this sliding bar is pivoted to the upper end of the bait-hook $h$, and is held forward by the weight $h'$ attached to the hook $h$, near its lower end, as shown in Fig. 2.

H is a housing for the bait-hook, which protects the bait on the hook from the caught animal; and $j$ represents a series of hooked and pointed wires secured in the under side and near the forward edge of the central cross-piece, $f$, to prevent the escape of the caught animal over the top or inner edge of the board E; and the top or inner edge of this board is provided with the pointed wires $j'$, which also serve to prevent any attempt of the caught animal to escape.

As above-mentioned, the weighted arm F will normally hold the trap set—that is, it will turn the shaft D so that the wires $g$ will be held in horizontal position, and the board E in inclined position, and this position of the shaft will carry the detent $i'$ below the forward end of the sliding bar $i$, which will be moved over it by the weight $h'$ on the bait-hook, and will hold the parts in this set position until an animal walks up the board E to the bait and attempts to detach it from the bait-hook. This meddling of the animal at the bait will cause the bar $i$ to slide backward and release the detent $i'$, whereupon the weight of the animal overbalancing the weight of the lever F will cause the board E to drop, the board G to tip up, and the wires $g$ to be swung down to the position shown in Fig. 2, cutting off all retreat of the animal and causing him to jump from the board E into the box. The weight of the animal having now been removed from the board E, the weight of the arm F will turn the shaft D, and reset the trap ready for the next animal, and prevent all possible escape of the animal in the box.

Thus constructed, it will be seen that the trap is always set, requiring no attention except to rebait the hook, when necessary, and to kill and remove the animals caught.

Having thus fully described my invention, I claim as new and desire to secure by Letters Patent—

1. The combination, with the bait-hook, of the slide-bar $i$, the detent $i'$, the shaft D, the weighted lever F, the arm $a$, the rod $b$, the hinged board E, the tip-board G, and the swinging wires $g$, whereby the animal's retreat is cut off, as described.

2. The combination, with the hinged platform E, operating as described, of the board G, hinged at one end to said platform and connected by a hinged bar, $f'$, to one side of the box, whereby when the platform drops with the animal the board is thrown up to frighten him, as described.

3. The self-setting trap, herein shown and described, consisting of the box A, hinged board E, tip-up board G, shaft D, wires $g$, and weighted arm F attached thereto, and the sliding bar $i$, and weighted bait-hook $h$, the shaft being formed with the segmental detent $i'$ and attached to the board E by means of the arm $a$ and rod $b$, substantially as described.

BENJAMIN F. D. MILLER.

Witnesses:
H. J. KAUFMAN,
H. E. KAUFMAN.